(12) United States Patent
Chapman et al.

(10) Patent No.: US 10,650,712 B2
(45) Date of Patent: May 12, 2020

(54) ORDERED MAPPING ON A THREE-DIMENSIONAL PROJECTION SURFACE

(71) Applicant: Disney Enterprises, Inc., Burbank, CA (US)

(72) Inventors: Steven M. Chapman, Burbank, CA (US); Joseph Popp, Burbank, CA (US); Mehul Patel, Burbank, CA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 20 days.

(21) Appl. No.: 16/024,628

(22) Filed: Jun. 29, 2018

(65) Prior Publication Data

US 2020/0005688 A1  Jan. 2, 2020

(51) Int. Cl.
*G09G 3/00* (2006.01)
*G06T 15/04* (2011.01)

(52) U.S. Cl.
CPC ............ *G09G 3/001* (2013.01); *G06T 15/04* (2013.01)

(58) Field of Classification Search
CPC .......... G06T 15/506; G09G 2320/0646; G09G 3/3426; G09G 2320/0233; G09G 2320/062; G09G 5/005; G09G 2360/16; G09G 3/3406
See application file for complete search history.

(56) References Cited

U.S. PATENT DOCUMENTS

| | | | | |
|---|---|---|---|---|
| 4,851,840 A * | 7/1989 | McAulay | ................. | G02F 7/00 341/137 |
| 2010/0289833 A1* | 11/2010 | Budzelaar | ............ | G09G 3/3426 345/690 |
| 2011/0037785 A1* | 2/2011 | Shiomi | ................ | G09G 3/3426 345/690 |
| 2015/0170399 A1* | 6/2015 | Li | ............................ | G06K 9/46 345/426 |
| 2016/0080710 A1* | 3/2016 | Hattingh | .............. | H04N 9/3185 348/52 |

* cited by examiner

*Primary Examiner* — Haixia Du
(74) *Attorney, Agent, or Firm* — Dorsey & Whitney LLP

(57) ABSTRACT

Systems and methods are provided for presenting visual media on a structure having a plurality of unordered light sources, e.g., fiber optic light sources, light emitting diodes (LEDs), etc. Visual media can be created based on a computer model of the structure. Images of the structure can be analyzed to determine the location of each of the light sources. A lookup table can be generated based on the image analysis, and used to correlate pixels of the visual media to one or more of the actual light sources. A visual media artist or designer need not have prior knowledge of the order/layout of the light sources on the structure in order to create visual media to be presented thereon.

25 Claims, 6 Drawing Sheets

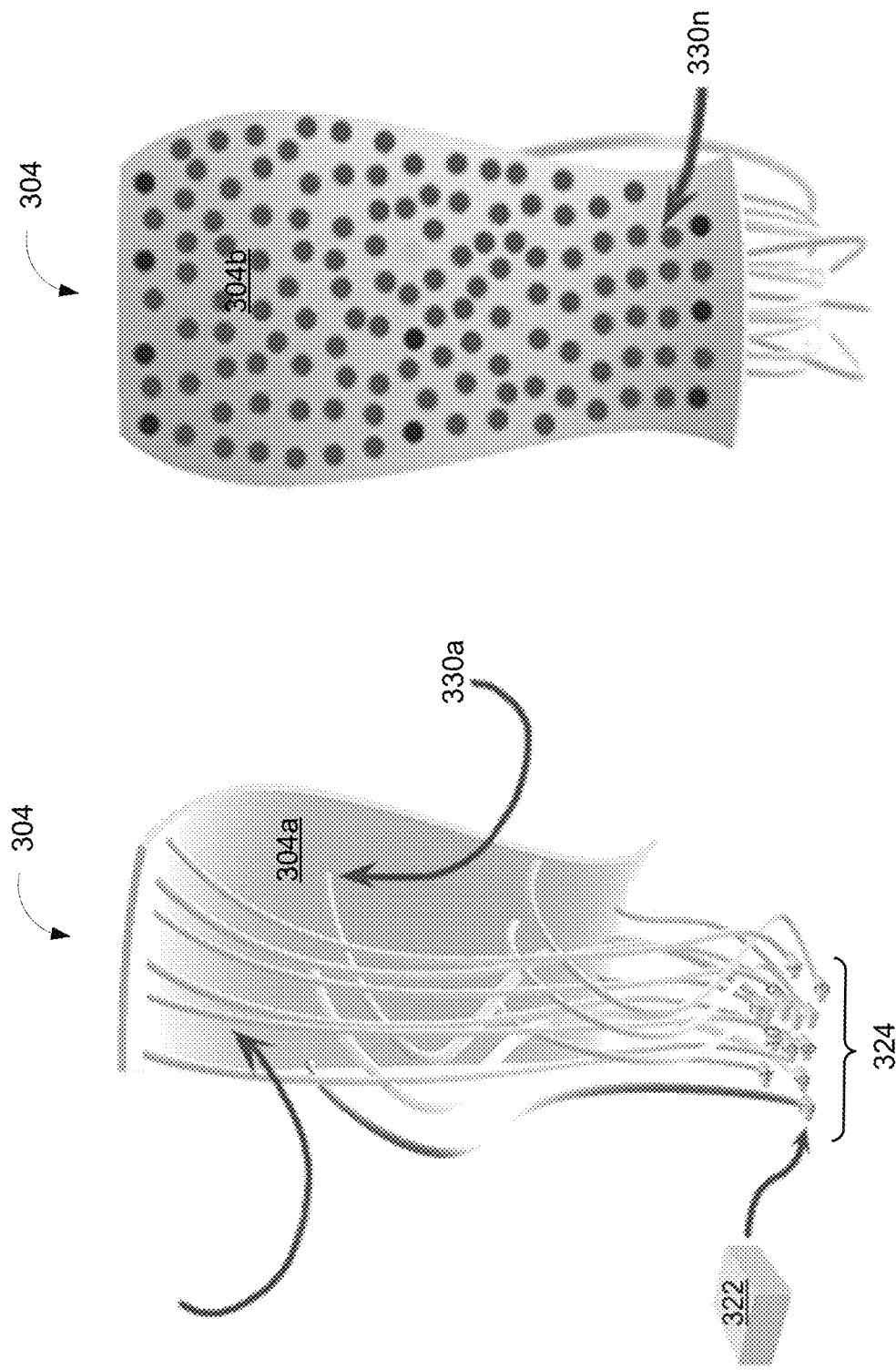

ORDERED MAPPING ON A THREE-DIMENSIONAL PROJECTION SURFACE

TECHNICAL FIELD

The present disclosure relates generally to displays, and more particularly, to generating media on three-dimensional (3D) displays having unordered lights sources.

DESCRIPTION OF THE RELATED ART

Media, such as electronic images, video, etc. may be presented on displays such as liquid crystal displays (LCDs), light-emitting diode displays (LEDs), plasma display panels (PDPs), and the like. Such displays act as an output device for the presentation of such media. Generally, such displays output media through an array of light sources. For example, in the case of LEDs, an array of light-emitting diodes output light making up a portion of the media being presented. For example, in the case of LCDs or PDPs, a display can be made up of pixels, each outputting red, blue, or green light that can be switched on or off to generate a moving picture.

BRIEF SUMMARY OF THE DISCLOSURE

In accordance with one embodiment, a computer-implemented method comprises generating a computer model of a display surface, where the display surface comprises an unordered array of light sources. The computer-implemented method further comprises generating visual media to be presented on the display surface using the computer model of the display surface, and generating a map of light emission locations on the display surface. Moreover, the computer-implemented method comprises generating correspondence information between the computer model of the display surface and the map of light emission locations on the display surface, and transmitting signals representative of the visual media to one or more light sources of the unordered array of light sources based on the correspondence information.

In some embodiments, generating the visual media comprises projecting a texture map representative of the visual media onto the computer model. In some embodiments, the texture map comprises at least one of color characteristics of the visual media and surface attributes of the visual media. In some embodiments, the computer-implemented method further comprises storing the texture map projection as a representation of the visual media.

In some embodiments, generating the map of the light emission locations comprises capturing one or more images representative of the display surface. In some embodiments, generating the map of the light emission locations further comprises analyzing the one or more images to detect patterns representative of the light emission locations.

In some embodiments, the map of the light emission locations comprises a lookup table generated based on the detected patterns representative of the light emission locations. In some embodiments, the lookup table comprises a gray code lookup table. In some embodiments, generating the correspondence information comprises correlating pixels of the visual media with each of the one or more light sources based on the lookup table.

In some embodiments, the computer model comprises a three-dimensional computer model.

In some embodiments, the map of the light emission locations comprises a three-dimensional map of the light emission locations.

In accordance with one embodiment, a system comprises a processor, and a memory unit operatively connected to the processor. The memory unit includes computer code configured to cause the processor to: generate a map of light emission locations on the display surface, the display surface comprising a plurality of unordered light sources corresponding to the light emission locations; correlate pixels of a computerized visual media to the light emission locations on the display surface based on a lookup table comprising information reflecting the map of light emission locations; and transmit signals representative of the computerized visual media to one or more light sources of the plurality of unordered light sources based on the correlation of the pixels to the light emission locations.

In some embodiments, the computerized the visual media comprises a projection of a texture map onto a computer model of the display surface. In some embodiments, the display surface is a three-dimensional display surface, and wherein the computer model comprises a three-dimensional computer model. In some embodiments, the texture map comprises at least one of color characteristics of the visual media and surface attributes of the visual media.

In some embodiments, the map of light emission locations is based on detected patterns representative of the light emission locations.

In some embodiments, the lookup table comprises a gray code lookup table.

In some embodiments, the map of light emission locations comprises a three-dimensional map of the light emission locations.

In some embodiments, each of the one or more light sources comprises at least one of a fiber-optic light source, a light emitting diode, an organic light emitting diode, and an electroluminescent light source.

In some embodiments, each of the one or more light sources comprises a networked and addressable light source.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

FIGS. 3B and 3C illustrate interior and exterior aspects of the example 3D display structure of FIG. 3A.

The figures are not exhaustive and do not limit the present disclosure to the precise form disclosed.

DETAILED DESCRIPTION

Conventional displays are able to present visual media by virtue of ordered light sources to which signals representative of the visual media are transmitted, e.g., a matrix of pixels, each having an address to which signals are sent. That is, signals representative of the visual media can be routed to the appropriate light sources when a source of the visual media is aware of the particular layout of those light sources. However, conventional systems and methods are unable to transmit visual media to displays whose light sources are unordered, i.e., when each particular light source is not pre-mapped or known beforehand. It should be understood this lack of order can occur at various levels. For example, in some instances, the lack of order can be at the electronics, input/output level, where a wire for a first LED may connect to a particular electronic input, and a wire for a second LED may connect to another electronic input. When this mapping or correlation is not known, a display comprising these elements may be considered to be unordered.

Thus, in scenarios where visual media cannot be presented on conventional displays (such as flat screen monitors), visual media can be transmitted only after manually mapping the visual media to be displayed to particular light sources making up a display(s). For example, conventional methods of presenting visual media on 3D structures wrapped in fiber optic light sources involve manually creating a map of each fiber optic light source or some block of fiber optic light sources to allow signals to be routed to the appropriate fiber optic light source(s).

In contrast, various embodiments of the present are directed to systems and methods of presenting visual media, e.g., still images, video, and the like, on a display comprising an unordered array of light sources without the need for manual mapping. For example, a 3D display may comprise a plurality of light sources, such as LEDs, fiber optic light sources, and the like. A visual media artist or developer may create visual media based on a 3D model of the 3D display. A 3D map of the 3D display can be generated by detecting a pattern representative of the plurality of light sources. In some embodiments, the 3D map comprises a gray code-generated lookup table that can be used to correlate the signals representative of the visual media to the actual light sources making up the 3D display.

Figure 1:
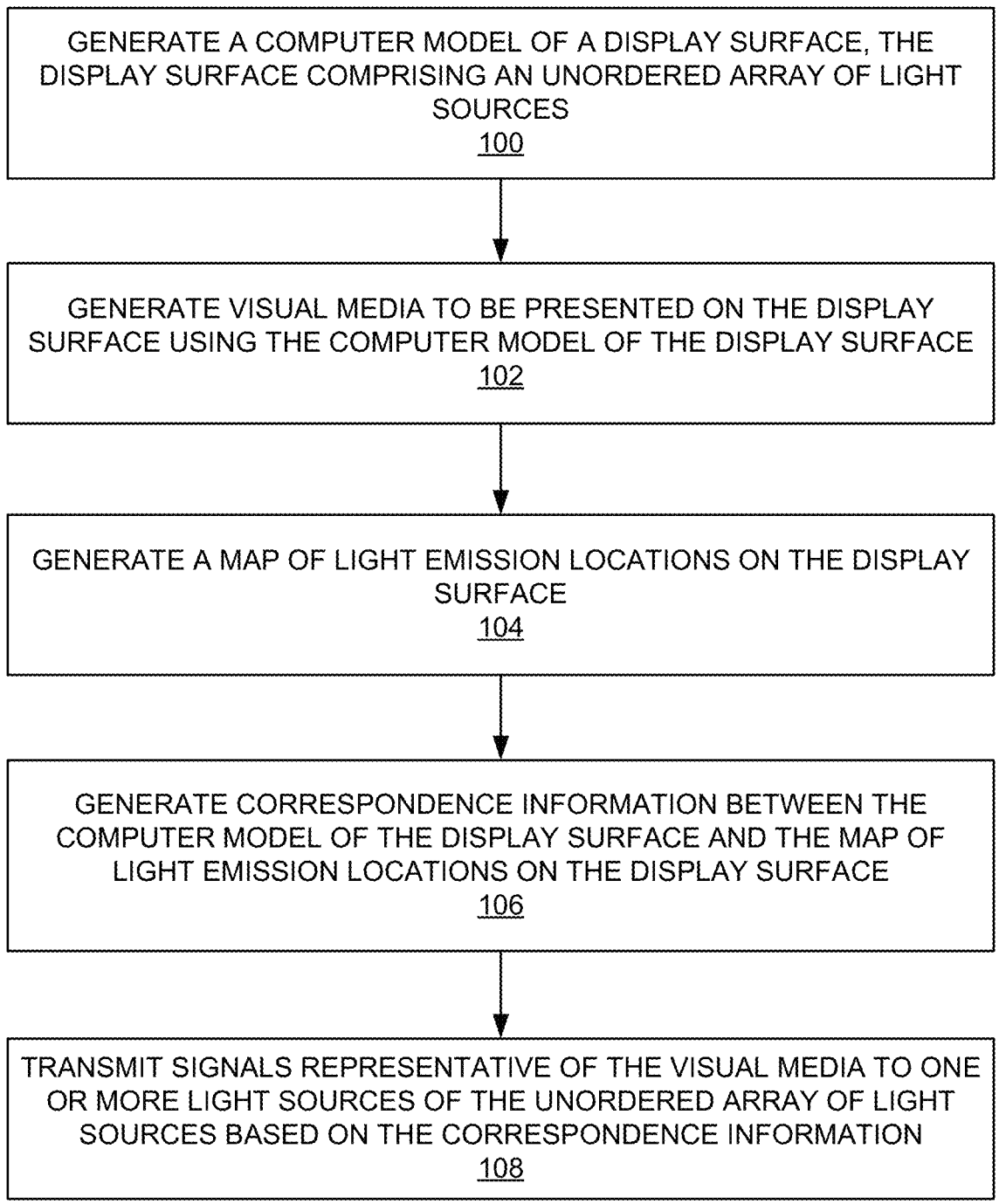
FIG. 1 is a flowchart of example operations that can be performed to present media on a display having unordered light sources.

FIG. 1 is a flow chart illustrating example operations that may be performed for presenting visual media on a display comprising unordered light sources. FIG. 1 may be described in conjunction with FIG. 2, which illustrates an example system architecture 200 in which the example operations set forth in the flow chart of FIG. 1 may be executed.

Figure 2:
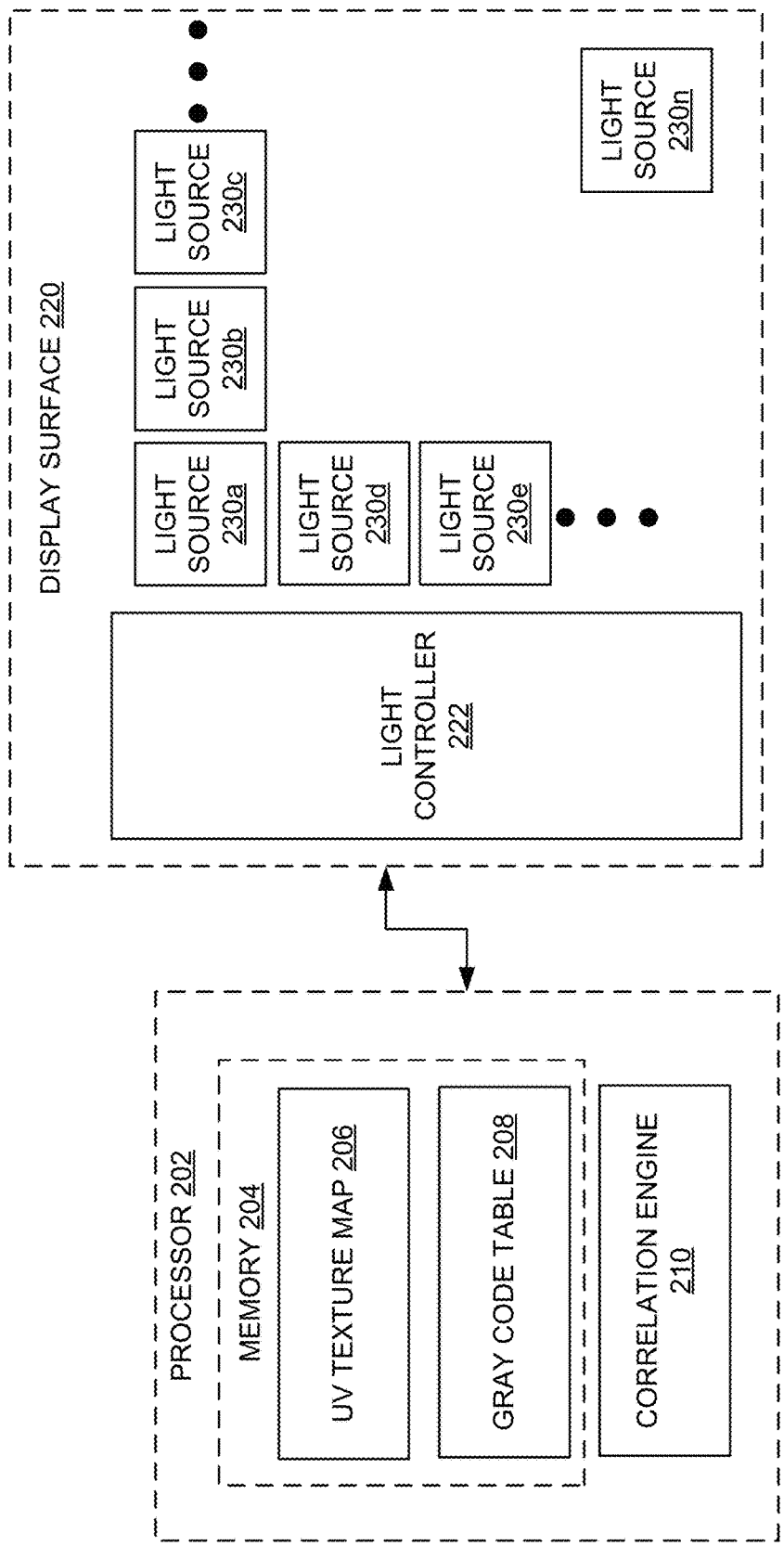
FIG. 2 is a schematic representation of a system architecture in which the media presentation operations of FIG. 1 may be implemented.

At operation 100, a computer model of a display surface is generated, which as alluded to above, may comprise an unordered array of light sources. In some embodiments, this computer model may be a 3D computer model. Referring to FIG. 2, a display surface 220 is shown to include a plurality of light sources, 230a, 230b, 230c, 230d, 230e . . . , and 230n. Each of light sources 230a-230n may comprise a fiber optic light source, an LED, an organic LED (OLED), an electroluminescent (EL) device, or other light source. Light sources 230a-230n may be overlaid or mounted on/in display surface 220. Display surface 220 may comprise one or more surfaces (planar, curved, or having some other shape(s)) of an underlying structure. As will be described below, one such example of an underlying structure may be one or more structural element of a parade float. In some embodiments, a combination of different types of light sources may be overlaid or mounted on/in display surface 220. Each of light sources 230a-230n may be adapted to receive a corresponding portion of a still image, video, some series of sequential images/videos, etc. via a light controller 222.

At operation 102, visual media to be presented on the display surface may be generated using the 3D computer model of the display surface. For example, a visual media artist or developer may create visual media to be displayed on display surface or structure 220. The visual media artist or developer may create the visual media based on a 3D computer model of display surface 220. One of ordinary skill in the art would understand that computer modeling software (e.g., 3D computer modeling software) can be used to generate a mathematical representation of the surface(s) of the display surface. For example, techniques such as polygonal modeling, curve modeling, or digital sculpting may be used to create the computer model of display surface 220.

The visual media artist or developer may create the desired visual media using known computer graphics software/methods based on the computer model. In one embodiment, the visual media may be created using UV texture mapping techniques. That is, the visual media may begin as a 2D image. UV texture mapping projects a texture map (mapped pixels of the 2D image) onto the computer model, which may be a 3D computer model as noted above. UV texture mapping allows polygons that make up the computer model to be paired with color and/or other surface attributes characterizing the visual media. A UV texture map(s) 206 representative of the visual media to be presented may be stored in memory 204 of a processor 202.

Memory 204 may include one or more various forms of memory or data storage (e.g., flash, RAM, etc.) that may be used to store data comprising a UV texture map(s) 206. As will be discussed below, memory 204 may also be used to store map data (e.g., a gray code table 208). Processor 202 may comprise hardware circuitry, software, or a combination of both. Processor 202 may be implemented in a computer or other processing device operatively connected to display surface 220 for generating information that can be used by light controller 222 to drive or direct signals representative of the visual media to light sources 230a-230n.

Referring back to FIG. 1, a map of light emission locations on the display surface can be generated at operation 104. In one embodiment, the map of light emission locations may be a 3D map. For example, images of display surface 220 may be captured by one or more cameras (not shown) and stored in memory 204. The images of display surface 220 may be analyzed by an image analysis algorithm to determine a pattern representative of the locations of light sources 230a-230n on display surface 220. Once a pattern(s) is detected, a lookup table can be created. In one embodiment, the map of light emission locations may comprise a gray code lookup table, e.g., gray code table 208, and stored in memory 204. Gray codes may be used to analyze signals while reducing errors in analog to digital signal conversion. In accordance with various embodiments, analog photons representative of the visual media to be presented can be translated into digital control sequences. Thus Gray codes can be used for the aforementioned mapping. It should be noted that in some embodiments, another mapping scheme may be used inasmuch as the likelihood of any two light sources being neighbors is less than would be the case with an ordered display. In other words, errors that might occur in an unordered display due to a mis-mapping of signals to light sources may not necessarily be great enough to warrant Gray codes. For example, mapping may be accomplished by addressing light source outputs sequentially. Simultaneous images may be captured to record output positions of the light sources connected to/associated with a particular output address, e.g., "light at 000001 on, off" or "light at 000002 on, off."

Referring back to FIG. 1, correspondence information between the computer model of the display surface and the map of light emission locations on the display surface can be generated at operation 106. That is, once the desired visual media represented by a UV texture map 206 is generated, a correlation engine 210 of processor 202 may determine the correspondence between pixels of the visual media and each of the light sources 230a-230n using gray code table 208. For example, correspondence information can be generated indicating that a pixel coordinate of (100,100) in the UV texture map 206 corresponds to a particular light source, e.g., 230d, on display surface 220. In this way, signals representative of the visual media to be presented on display surface 220 can be routed to any one or more of the appropriate light sources 230a-230n.

It should be noted that other systems and methods of presenting visual media through projection techniques, e.g., laser projection, rely on averaging functions to account for in-between locations/points on a display or surface onto which the visual media is to be projected. Here, each light source can be accounted for. In accordance with one embodiment, images of the display surface 220 may be captured, where only a subset of light sources 230a-230n of display surface 220 are illuminated. In one embodiment, half of light sources 230a-230n may be illuminated. By capturing images of display surface 220 when only half of light sources 230a-230n are illuminated or active, the bits controlling those illuminated light sources are known to have a most-significant bit address of "0" or "1." For example, light sources 230a-230n comprise, sixteen light sources, effectively comprising a computer input/output (I/O) controller with an address from 0-15 or 0000-1111 in binary. A second light I/O address bit may be turned on creating four location possibilities (00, 01, 10, and 11). Additional photos may capture which lights are being lit with these location addresses, e.g., imaging a third light I/O address (000m 001, 010, 011, 100, 101, 110, 111), and so on until all light sources 230a-230n are accounted for.

Again, referring back to FIG. 1, the signals representative of the visual media can be transmitted to one or more light sources of the unordered array of light sources based on the correspondence information at operation 108. For example, correspondence information generated by correlation engine 210 can be transmitted to light controller 222. Light controller 222 may analyze the correspondence information to determine which portion(s) or aspect(s) of an image or video represented by the UV texture map 206 are to be transmitted to which light source(s) 230a-230n. Upon making this determination, light controller 222 may transmit the signals representative of the image or video to the appropriate light source.

Processor 202 may communicate with light controller 222 by way of a wired or wireless connection. For example, processor 202 may, as noted above, be embodied in a computing device, such as a laptop computer. Accordingly, processor 202 may connect with light controller 222 via a Universal Serial Bus (USB) connection, a serial communication bus, or other physical communications connection. In other embodiments, processor 202 may connect to and communicate with light controller 222 wirelessly, such as over a local area network (LAN), Wi-Fi connection, Near Field Communications (NFC) connection, or the like.

Figure 3A:
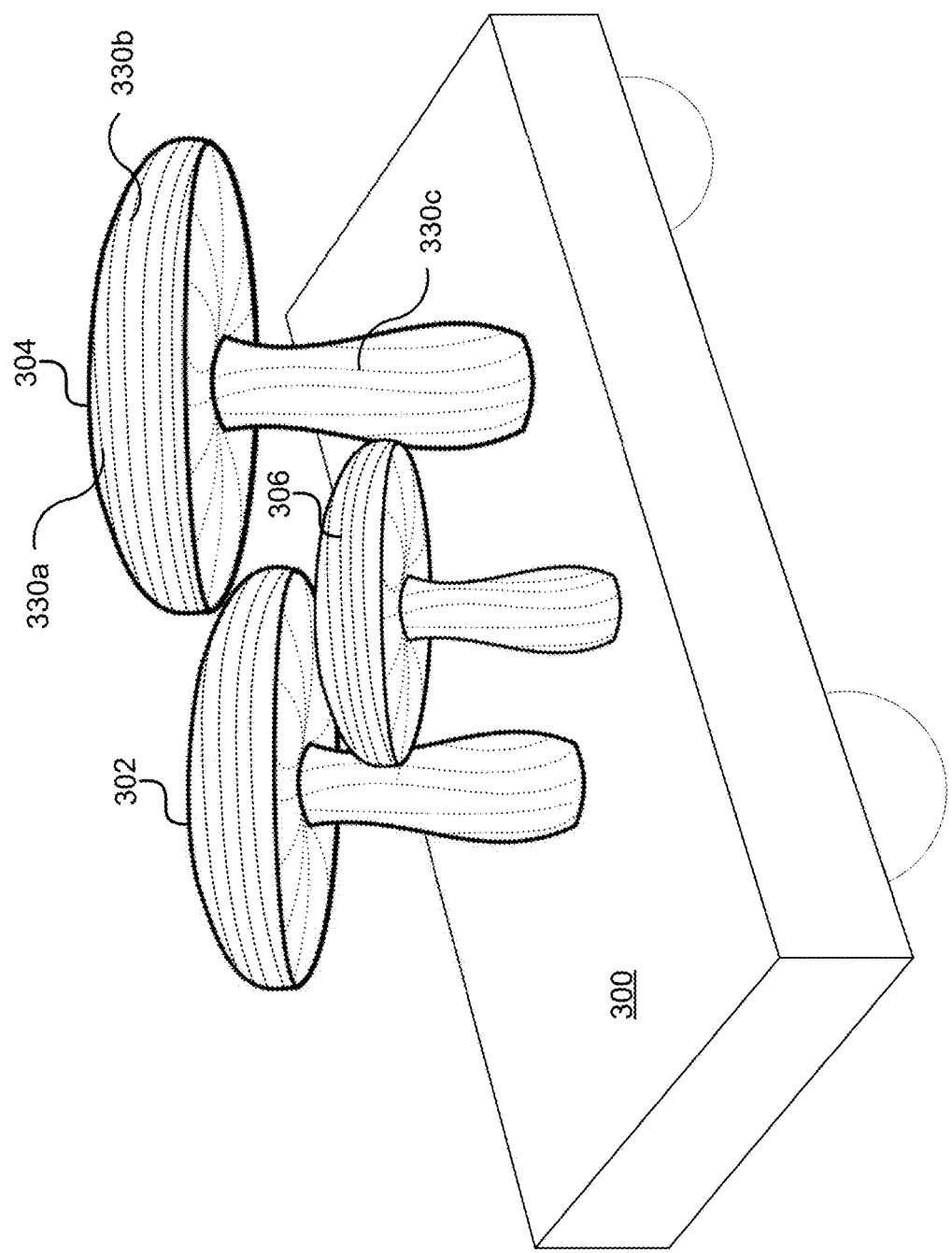
FIG. 3A illustrates an example 3D display structure.

FIG. 3A illustrates an example structure 300, e.g., a parade float, comprising one or more elements 302, 304, and 306 having one or more display surfaces on which visual media may be displayed. For example, element 302 may be a mushroom-shaped structure comprising a cap and stem. A plurality of light sources, e.g., fiber optic light sources, may emit light through one end of a fiber optic line or cable carrying light transmissions. Each end of a fiber optic line or cable can be used to emit light representative of a pixel corresponding to the visual media embodied as a UV texture map, e.g., UV texture map 206 (FIG. 2), examples of which are fiber optic light sources 330a, 330b, and 330c.

FIG. 3B illustrates a back or rear-facing surface 304a of element 304 through which the ends of a plurality of fiber optic lines are routed. Each of these fiber optic lines (i.e., light sources) can be operatively connected to a light controller 322. As discussed above, a light controller can be responsible for routing signals representative of the visual media to the appropriate light source(s). In this embodiment, light controller 322 may be a networked, addressable light emission source (in the case of fiber optic light sources) or an address decoder (in the case of LED light sources). Based on the aforementioned mapping, each light source of structure 300 is associated with an address stored in the lookup table, e.g., gray code table 208 (FIG. 2). Thus, light controller 322 can determine that a particular light source such as light source 330a is one out of the mapped light sources and its address. Moreover, the lookup table precisely corresponds to the x,y pixel values in the visual media to be presented.

FIG. 3C illustrates a front-facing surface 304b of element 304. As illustrated in FIG. 3C, one end of each fiber optic line or cable through which light is transmitted is revealed on front-facing surface 304b. For example, a cavity or aperture can be created from the rear surface 304a to front-facing surface 304b through which one or more fiber optic lines can be routed to allow each end of each fiber optic line to be visible on front-facing surface 304b, an example of which is the end of a fiber optic light source 330n.

Figure 3D:
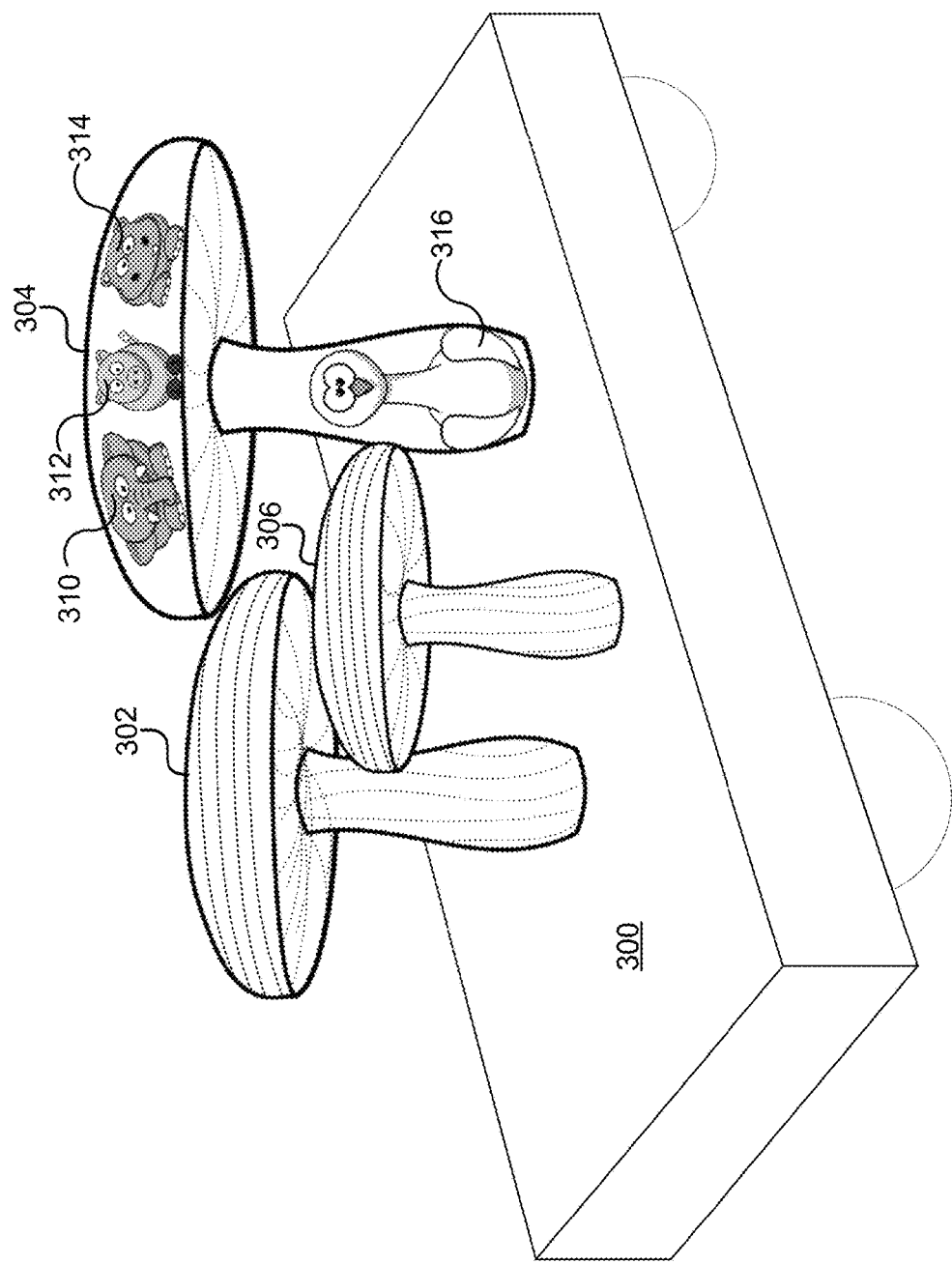
FIG. 3D illustrates an example presentation on the 3D display structure of FIG. 3A.

FIG. 3D illustrates an example presentation of visual media on the structure 300. Visual media elements 310, 312, 314, and 316 can be rendered on surfaces of the element 304 with light sources, such as LEDs, fiber optic light sources, etc. As noted above, manual mapping of the light sources, need not be performed. Moreover, a visual media artist or developer need not be aware of the address of location of the light sources in order to create visual media for presentation on a display surface using the light sources. Rather, the visual media artist or developer is free to create the desired visual media based solely on a 3D model representative of the 3D structure on or through which the light sources are mounted or otherwise implemented.

It should be noted that although embodiments described herein contemplate the presentation of visual media on 3D displays, systems and methods of presenting visual media can be applied to 2D displays as well. That is, other embodiments can present visual media on any type of display having unordered light sources.

Figure 4:
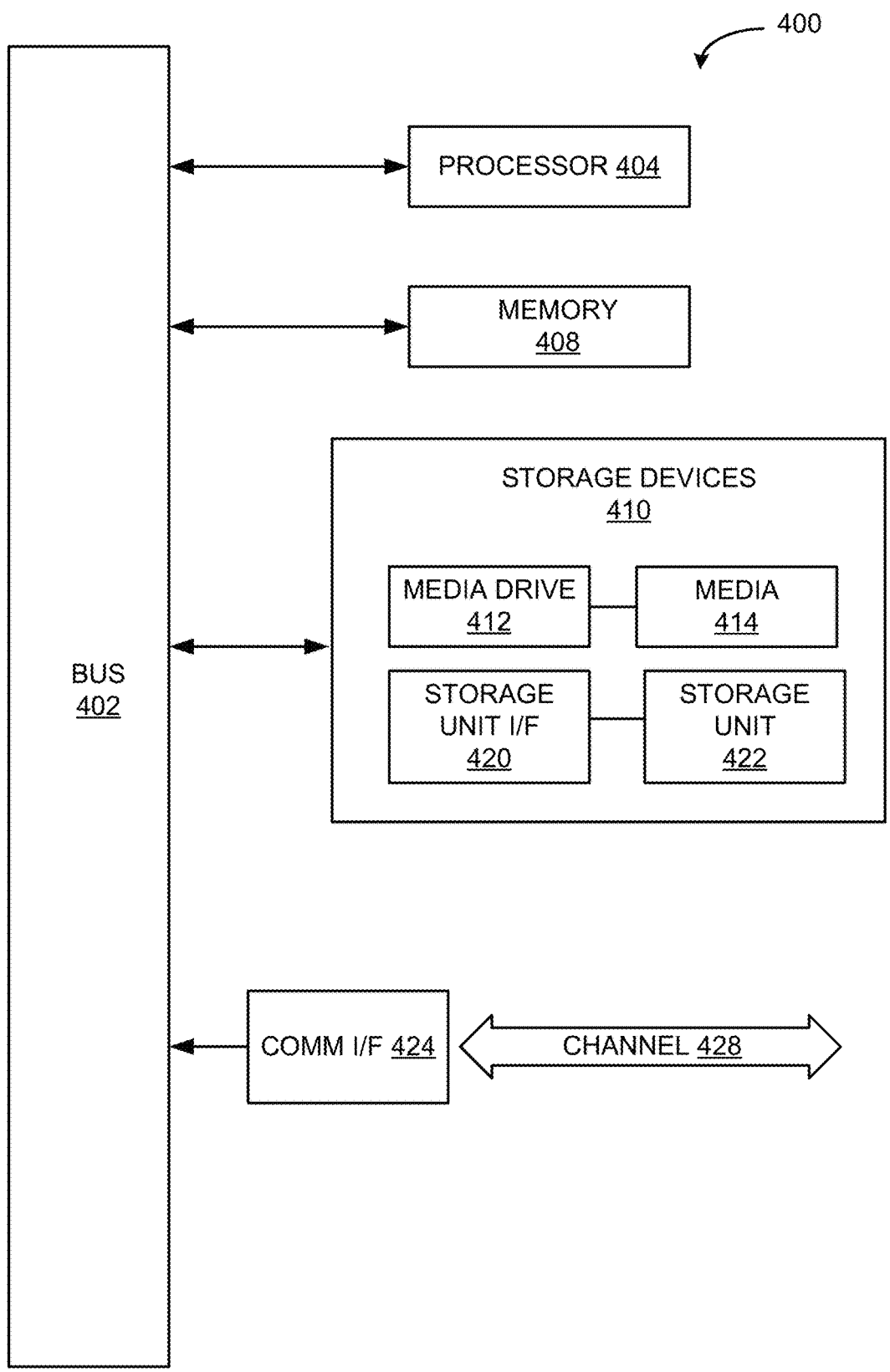
FIG. 4 is an example computing component that may be used to implement various features of embodiments described in the present disclosure.

FIG. 4 illustrates an example computing component that may be used to implement various features of the system and methods disclosed herein, for example, one or more elements of system 200, e.g., processor 202, light controller 222, etc.

As used herein, the term component might describe a given unit of functionality that can be performed in accordance with one or more embodiments of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. In implementation, the various components described herein might be implemented as discrete components or the functions and features described can be shared in part or in total among one or more components. In other words, as would be apparent to one of ordinary skill in the art after reading this description, the various features and functionality described herein may be implemented in any given application and can be implemented in one or more separate or shared components in various combinations and permutations. Even though various features or elements of functionality may be individually described or claimed as separate components, one of ordinary skill in the art will understand that these features and functionality can be shared among one or more common software and hardware elements, and such description shall not require or imply that separate hardware or software components are used to implement such features or functionality.

Where components of the application are implemented in whole or in part using software, in one embodiment, these software elements can be implemented to operate with a computing or processing component capable of carrying out the functionality described with respect thereto. One such example computing component is shown in FIG. 4. Various embodiments are described in terms of this example-computing component 400. After reading this description, it will become apparent to a person skilled in the relevant art how to implement the application using other computing components or architectures.

Referring now to FIG. 4, computing component 400 may represent, for example, computing or processing capabilities found within a self-adjusting display, desktop, laptop, notebook, and tablet computers; hand-held computing devices (tablets, PDA's, smart phones, cell phones, palmtops, etc.); workstations or other devices with displays; servers; or any other type of special-purpose or general-purpose computing devices as may be desirable or appropriate for a given application or environment. Computing component 400 might also represent computing capabilities embedded within or otherwise available to a given device. For example, a computing component might be found in other electronic devices such as, for example navigation systems, portable computing devices, and other electronic devices that might include some form of processing capability.

Computing component 400 might include, for example, one or more processors, controllers, control components, or other processing devices, such as a processor 404. Processor 404 might be implemented using a general-purpose or special-purpose processing engine such as, for example, a microprocessor, controller, or other control logic. In the illustrated example, processor 404 is connected to a bus 402, although any communication medium can be used to facilitate interaction with other components of computing component 400 or to communicate externally.

Computing component 400 might also include one or more memory components, simply referred to herein as main memory 408. For example, preferably random access memory (RAM) or other dynamic memory, might be used for storing information and instructions to be executed by processor 404. Main memory 408 might also be used for storing temporary variables or other intermediate information during execution of instructions to be executed by processor 404. Computing component 400 might likewise include a read only memory ("ROM") or other static storage device coupled to bus 402 for storing static information and instructions for processor 404.

The computing component 400 might also include one or more various forms of information storage mechanism 410, which might include, for example, a media drive 412 and a storage unit interface 420. The media drive 412 might include a drive or other mechanism to support fixed or removable storage media 414. For example, a hard disk drive, a solid state drive, a magnetic tape drive, an optical disk drive, a compact disc (CD) or digital video disc (DVD) drive (R or RW), or other removable or fixed media drive might be provided. Accordingly, storage media 414 might include, for example, a hard disk, an integrated circuit assembly, magnetic tape, cartridge, optical disk, a CD or DVD, or other fixed or removable medium that is read by, written to or accessed by media drive 412. As these examples illustrate, the storage media 414 can include a computer usable storage medium having stored therein computer software or data.

In alternative embodiments, information storage mechanism 410 might include other similar instrumentalities for allowing computer programs or other instructions or data to be loaded into computing component 400. Such instrumentalities might include, for example, a fixed or removable storage unit 422 and an interface 420. Examples of such storage units 422 and interfaces 420 can include a program cartridge and cartridge interface, a removable memory (for example, a flash memory or other removable memory component) and memory slot, a PCMCIA slot and card, and other fixed or removable storage units 422 and interfaces 420 that allow software and data to be transferred from the storage unit 422 to computing component 400.

Computing component 400 might also include a communications interface 424. Communications interface 424 might be used to allow software and data to be transferred between computing component 400 and external devices. Examples of communications interface 424 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 424 might typically be carried on signals, which can be electronic, electromagnetic (which includes optical) or other signals capable of being exchanged by a given communications interface 424. These signals might be provided to communications interface 424 via a channel 428. This channel 428 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media such as, for example, memory 408, storage unit 420, media 414, and channel 428. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 400 to perform features or functions of the present application as discussed herein.

Although described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the application, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the components or functionality described or claimed as part of the component are all configured in a common package. Indeed, any or all of the various components of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A computer-implemented method, comprising:
   generating a computer model of a display surface, the display surface comprising an unordered array of light sources;
   generating a visual media to be presented on the display surface using the computer model of the display surface;
   generating a map of light emission locations on the display surface;
   generating correspondence information between the computer model of the display surface and the map of light emission locations on the display surface; and
   transmitting signals representative of the visual media to one or more light sources of the unordered array of light sources based on the correspondence information.

2. The computer-implemented method of claim 1, wherein generating the visual media comprises projecting a texture map representative of the visual media onto the computer model.

3. The computer-implemented method of claim 2, wherein the texture map comprises at least one of color characteristics of the visual media or surface attributes of the visual media.

4. The computer-implemented method of claim 2, further comprising storing the texture map projection as a representation of the visual media.

5. The computer-implemented method of claim 1, wherein generating the map of the light emission locations comprises capturing one or more images of the display surface.

6. The computer-implemented method of claim 5, wherein generating the map of the light emission locations further comprises analyzing the one or more images to detect patterns representative of the light emission locations.

7. The computer-implemented method of claim 6, wherein the map of the light emission locations comprises a lookup table, wherein the lookup table is generated based on the detected patterns representative of the light emission locations.

8. The computer-implemented method of claim 7, wherein the lookup table comprises a gray code lookup table.

9. The computer-implemented method of claim 7, wherein generating the correspondence information comprises correlating pixels of the visual media with the one or more light sources based on the lookup table.

10. The computer-implemented method of claim 1, wherein the computer model comprises a three-dimensional computer model.

11. The computer-implemented method of claim 1, wherein the map of the light emission locations comprises a three-dimensional map of the light emission locations.

12. A system, comprising:
   a processor; and
   a memory unit operatively connected to the processor, the memory unit including computer code configured to cause the processor to:
      generate a map of light emission locations on a display surface based on detected patterns representative of the light emission locations of a plurality of unordered light sources of the display surface;
      correlate pixels of a visual media to the light emission locations on the display surface based on a lookup table comprising information reflecting the map of light emission locations; and
      transmit signals representative of the visual media to one or more light sources of the plurality of unordered light sources based on the correlation of the pixels of the visual media to the light emission locations.

13. The system of claim 12, wherein the visual media comprises a projection of a texture map onto a computer model of the display surface.

14. The system of claim 13, wherein the display surface is a three-dimensional display surface and the computer model comprises a three-dimensional computer model.

15. The system of claim 13, wherein the texture map comprises at least one of color characteristics of the visual media or surface attributes of the visual media.

16. The system of claim 12, wherein the lookup table comprises a gray code lookup table.

17. The system of claim 12, wherein the map of light emission locations comprises a three-dimensional map of the light emission locations.

18. The system of claim 12, wherein each of the one or more light sources comprises at least one of a fiber-optic light source, a light emitting diode, an organic light emitting diode, or an electroluminescent light source.

19. The system of 12, wherein each of the one or more light sources comprises a networked and addressable light source.

20. A system, comprising:
a processor; and
a memory unit operatively connected to the processor, the memory unit including computer code configured to cause the processor to:
generate a computer model of a display surface, the display surface comprising an unordered array of light sources;
generate a visual media to be presented on the display surface using the computer model of the display surface;
generate a map of light emission locations on the display surface;
generate a correspondence information between the computer model of the display surface and the map of light emission locations on the display surface; and
transmit signals representative of the visual media to one or more light sources of the unordered array of light sources based on the correspondence information.

21. The system of claim 20, wherein the visual media comprises a projection of a texture map onto the computer model of the display surface.

22. The system of claim 20, wherein the display surface is a three-dimensional display surface, and wherein the computer model comprises a three-dimensional computer model.

23. The system of claim 20, wherein the map of light emission locations is based on detected patterns in one or more images of the display surface, wherein the detected patterns are representative of the light emission locations.

24. A computer-implemented method, comprising:
generating a map of light emission locations on a display surface corresponding to a plurality of unordered light surfaces, wherein the map of light emission locations is based on detected patterns representative of the light emission locations;
correlating pixels of a visual media to the light emission locations on the display surface based on a lookup table comprising information related to the map of light emission locations; and
transmitting signals representative of the visual media to one or more light sources of the plurality of unordered light sources based on the correlation of the pixels to the light emission locations.

25. The computer-implemented method of claim 24, wherein generating the map of the light emission locations comprises capturing one or more images representative of the display surface, and analyzing the one or more images to detect patterns representative of the light emission locations.

\* \* \* \* \*